Sept. 10, 1968   J. G. SAVINS ET AL   3,400,796
POWER TRANSMISSION DEVICE EMPLOYING A SHEAR THICKENING LIQUID
Filed Aug. 10, 1966   2 Sheets-Sheet 1
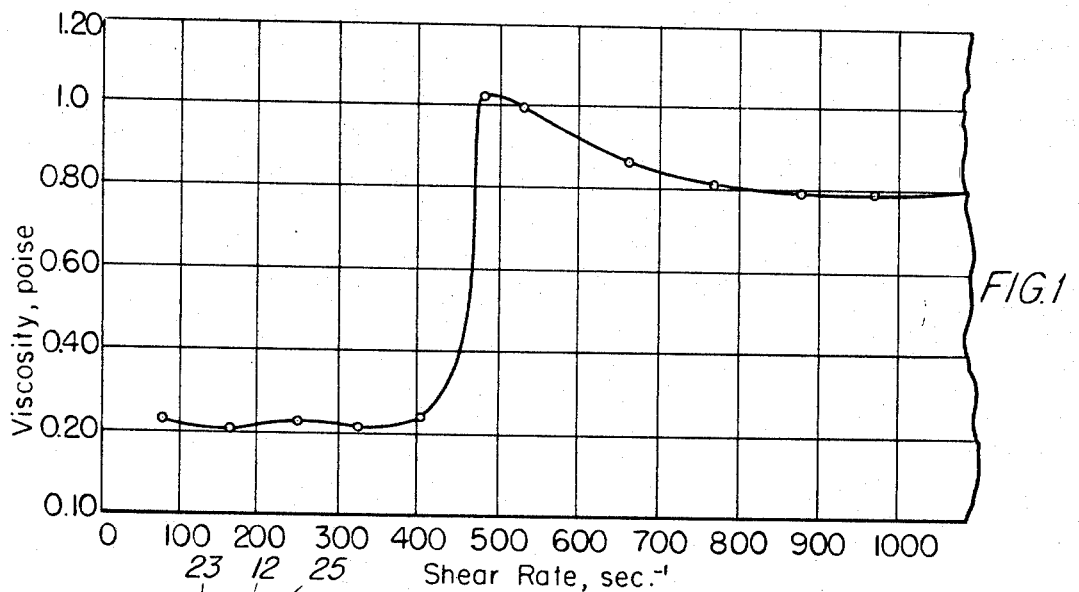
FIG.1
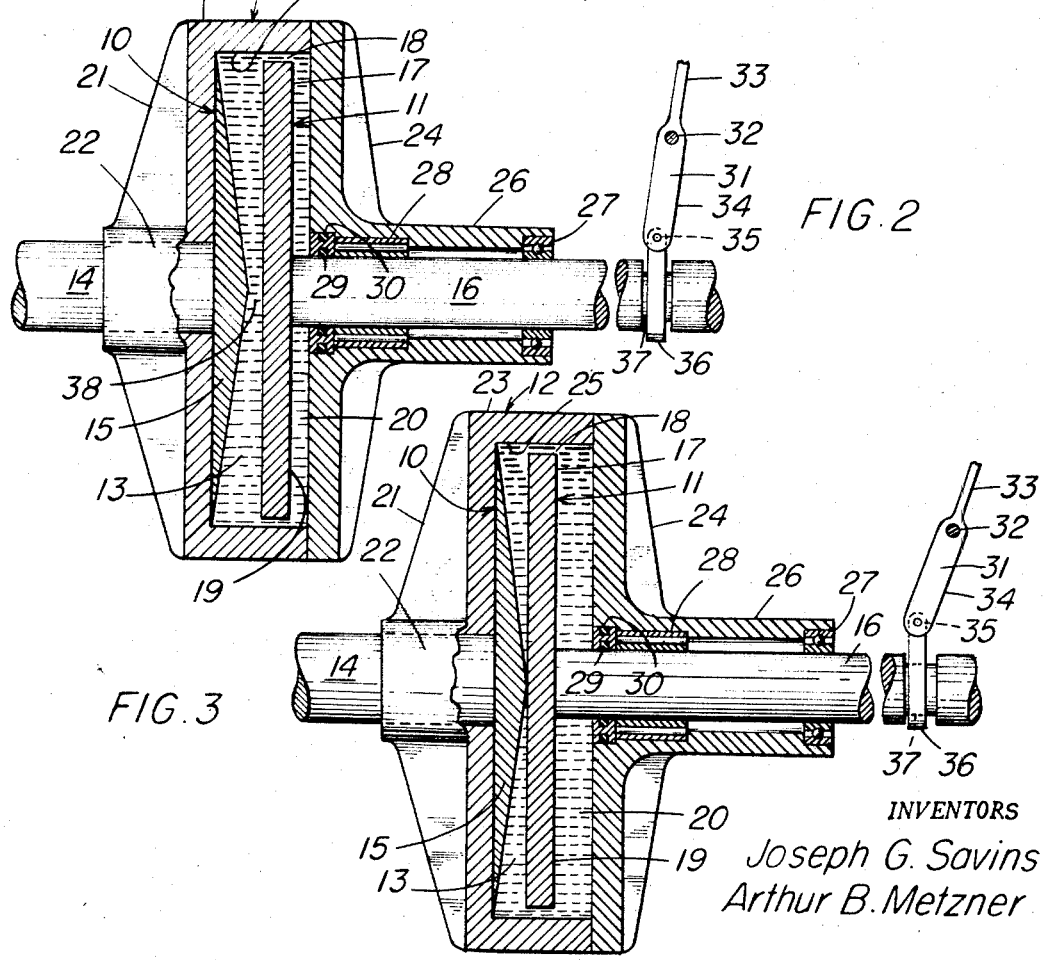
FIG.2
FIG.3
INVENTORS
Joseph G. Savins
Arthur B. Metzner

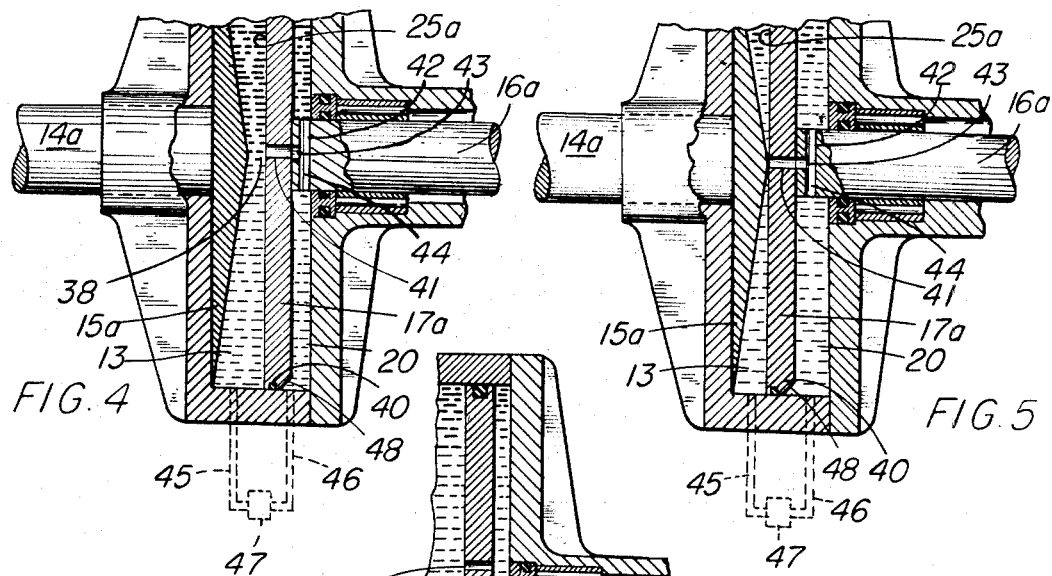
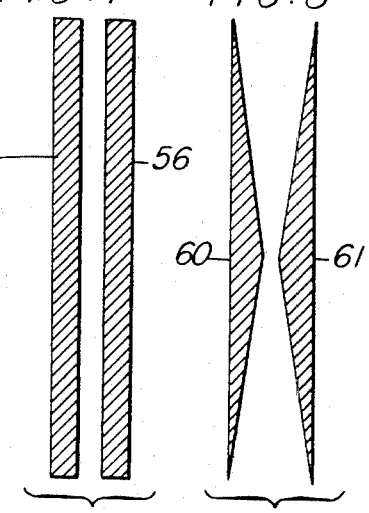
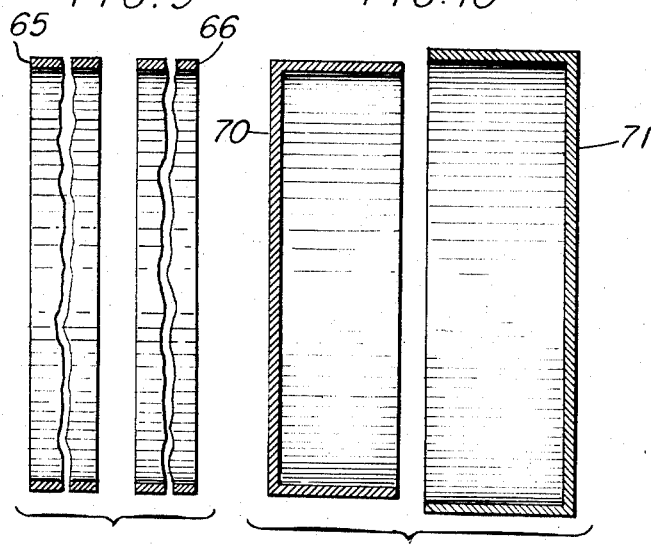
INVENTORS
Joseph G. Savins
Arthur B. Metzner

United States Patent Office 3,400,796
Patented Sept. 10, 1968

3,400,796
POWER TRANSMISSION DEVICE EMPLOYING A SHEAR THICKENING LIQUID
Joseph G. Savins, Dallas, Tex., and Arthur B. Metzner, Wilmington, Del., assignors to Mobil Oil Corporation, a corporation of New York
Filed Aug. 10, 1966, Ser. No. 571,548
8 Claims. (Cl. 192—58)

ABSTRACT OF THE DISCLOSURE

An improved power transmission device is provided comprising driving and driven members in axially spaced relationship with a shear-thickening liquid in the space between said members. The driving and driven members each comprise a flat or cone-shaped rotatable element and the driving member is able to rotate the driven member through the increased viscous resistance of said liquid.

---

This invention relates to a power-transmitting device of unusual simplicity and further characterized by the capability of operating at low power losses, especially at start up. The device employs very simple power-transmitting structures, such as cones and plates and the like, by virtue of which it is economical to design and fabricate.

Essentially the device comprises driving and driven members having a driving connection therebetween in the form of a rheologically complex liquid which is shear thickening, i.e., its viscous resistance or viscosity increases with increasing deformation or shear rate. The invention is further based on the discovery that as the viscosity of the liquid increases, its ability to transmit power from the driving to the driven member also increases. The contemplated liquids give rise to low power losses, owing to their reduced rate of viscous energy dissipation; and they exhibit low cooling requirements and reduced degradation by high temperatures. These effects are especially significant in applications of the device to heavy duty machinery.

The invention may be better understod by referring to the accompanying drawings, wherein:

FIG. 1 is a graph showing the variation of viscosity with shear rate of an illustrative liquid;

FIG. 2 is a broken view, partly in section, showing a cone-and-plate type fluid coupling which incorporates the power-transmitting concept of the invention and in which the coupling is shown in what may be described as a "no load" position wherein it transmits little or no torque;

FIG. 3 is a view like FIG. 2 but showing the coupling in a load position for the transmission of torque;

FIG. 4 is a partial view like FIG. 2 but showing a modification and also illustraing an optional structure;

FIG. 5 is a view like FIG. 4 showing the coupling in a position for transmitting torque;

FIG. 6 is a partial view like FIG. 4 but showing a modification;

FIG. 7 is a cross-sectional view of driving and driven members of the plate type, these being suitable for use in a coupling such as that shown in FIG. 1;

FIG. 8 is a view like FIG. 7 in which cone-type members are shown;

FIG. 9 is a view like FIG. 7 showing the members in the form of annular rings or cylinders; and FIG. 10 is also a view like FIG. 7 in which the members comprise interfitting cylinders.

Referring to FIG. 1, this illustrates shear-dependent viscosity behavior of a shear-thickening liquid and may provide some insight into the liquids contemplated as useful for the power-transmitting devices of the invention. The figure shows the relation between the viscosity in poises and the shear rate in reciprocal seconds over a shear rate ranging from less than 100 to more than 1000 reciprocal seconds (R.S.) for a specific liquid, namely, a mixture comprising 1.13% by weight of polyvinyl alcohol, 4.49% by weight of sodium borate, balance water, known commercially as "Lemol 42/88," a product of Borden Chemical Company. This is a rheologically complex liquid belonging to the category of shear-thickening liquids; it is also a viscoelastic liquid. It may be noted at this point that viscoelastic liquids comprise a preferred group of shear-thickening liquids; as the term implies, a viscoelastic liquid is one which exhibits both viscous and elastic behavior, having the flow properties of a liquid and the elastic properties of a solid. As is apparent from the graph, the viscosity or viscous resistance of the liquid has a fairly constant value of about 0.22 poise over a shear rate ranging from about 80 to more than 400 R.S. At a shear rate of about 475 R.S., designated the critical or threshold shear rate, the viscosity increases sharply, i.e., the liquid thickens. Above 475 R.S. the viscosity remains high, although it decreases from a peak of about 1.02 to about 0.80 as the shear rate increases to about 1080 R.S. It will be noted that the increase of viscosity at the threshold shear rate is represented by the ratio, 1.02:0.22, which is nearly fivefold and which represents an order-of-magnitude change; the viscous energy dissipation rate varies inversely with this ratio and hence may be seen to be of a low order.

According to the invention, the liquid of FIG. 1 is suitable for use in a power-transmitting device in which a driving member applies stress to the liquid so as to place the same in shear, and in which little or no torque is transmitted to the driven member by the liquid until its rate of shear exceeds the threshold shear rate of 475 R.S. When such rate is exceeded, the viscous resistance of the liquid is sufficiently high as to permit it to transfer torque.

A device of the foregoing description is illustrated in FIGS. 2 and 3 where a fluid coupling is shown comprising a driving member 10, a driven member 11, a housing 12 enclosing said members, and a complex liquid 13 of the kind described providing a driving connection between the members. Member 10 comprises a driving shaft 14, driven by means not shown, having attached thereto and disposed entirely within the housing a rotatable element having the form of a solid geometrical figure partially bounded or defined by curved surfaces. Such figure may be chosen from a number of suitable shapes, and in FIG. 2 it comprises the cone 15. Driven member 11 comprises the driven shaft 16 connected to a rotatable element 17 having the geometrical form of a plate or disc. The peripheral edges of the plate are slightly spaced, as at 18, from the housing, and similarly the outer side 19 of the plate is spaced from the housing by a gap 20.

Housing 12 may be of any suitable construction. As shown, it comprises a left hand side 21 having a hub 22 for supporting the shaft 14, and extending from such side is an annular peripheral flange 23. Opposite thereto is a right hand side 24 which is suitably attached to the flange 23 by means not shown to form a liquid tight compartment 25. The side 24 has an elongated hub 26 through which shaft 16 extends, being rotatably supported therein by bearings, such as those shown at 27, 28. A pair of seals 29, 30 are provided at the inner end of hub 26.

Outwardly of hub 26, suitable means are provided for axially moving plate 17 relatively to cone 15, such means comprising a lever 31 which is pivoted at 32. One end of the lever terminates in a handle portion partially shown at 33 while the other end 34 is pivotally connected at 35 to a collar 36 set in a groove 37 in the shaft 16. As is apparent, when portion 31 of the lever is moved to the left, as seen in FIG. 2, shaft 16 also moves to the left and plate 17 approaches cone 15; when portion 31 is moved to the right, shaft 16 also moves to the right and plate 17 moves away from cone 15. In FIG. 2 the relative positions of the plate and cone correspond to the "no load" position of the coupling.

While mechanical means in the form of lever 31 are shown for axially moving plate 17, it will be understood that other suitable conventional means may be employed, including electrical, pneumatic, or hydraulic means.

In operation, liquid 13 is placed in compartment 25 by means not shown so that it fills the compartment. Plate 17 is axially spaced from cone 15 substantially as shown, i.e., so that a fairly large clearance or gap 20 is present between the plate and the adjacent housing, and a corresponding gap 38 separates the plate and the cone. With drive shaft 14 rotating, cone 15 will apply a rotary stress to the liquid and cause it to undergo rotary or tangential shear. Let it be assumed for the moment that the liquid exhibits the viscosity/shear rate relation of FIG. 1, and that the liquid is properly chosen for the fluid coupling. Accordingly, since the gap 38 is large, the shear rate imposed on the liquid is low, i.e., less than, say, 400 R.S., and the resulting viscous resistance is also low, namely, about 0.2 poise. Consequently, little or no torque is transmitted by the liquid from the driving to the driven shafts. This condition is illustrated in FIG. 2 and represents "no load" operation. Now if plate 17 is moved axially nearer to the cone by appropriate operation of lever 31, as illustrated in FIG. 3, the shear rate will increase until it exceeds the threshold value of 475 R.S.; in turn the deformation rate of the liquid and its viscosity will increase to a value such that it will effectively transfer torque, and plate 17 and shaft 16 will rotate. Torque transmission will be quantitative except for losses incurred by viscous dissipation at the shear rate. This condition of torque transfer is illustrated in FIG. 3 and represents operation under load.

Although in FIG. 3 (and also FIG. 5) the plate 17 is shown as touching the apex of the cone, such contact is not actually necessary to enable torque to be transferred. Rather, and as will be understood, the liquid 13 rotates plate 17 by the effect of its viscous resistance. In FIG. 2, the viscous resistance is too low to effect rotation, whereas in FIG. 3 it is sufficiently high for this purpose. Referring to FIG. 3, it may be of interest to note that a suitably shaped cone is one which forms an angle of about 0.4 to 4° with the plate, these angles being merely illustrative.

As may be apparent, the characteristics of the coupling device and of the liquid to be used therein will be correlated to each other to assure that when the threshold shear rate of the liquid is exceeded, sufficient torque will be transmitted by the liquid to the driven member; and when the shear rate of the liquid is below the threshold value, little or no torque will be transmitted and the device will be in what may be termed an idling state. In the event that the liquid, at the time its threshold value is exceeded, does not develop sufficient viscosity to drive the driven member effectively, it will be understood that another and more suitable liquid will be selected which develops the required viscosity. In this connection, a liquid may be chosen whose threshold shear rate may vary widely, for example from 5 or 10 to 1000 or 2000 or more reciprocal seconds, it being understood that these are merely illustrative values; and it is to be understood that values of the viscous resistance developed are sufficient to transmit amounts of torque well within the ranges encountered in the applications herein contemplated.

It may be mentioned that whereas some liquids exhibit, below the threshold shear rate, a constant viscosity with increasing shear rate, followed by a sharp or sudden increase in viscosity when the threshold value is exceeded, as illustrated in FIG. 1, others may exhibit, below the threshold value, a gradually increasing viscosity with increasing shear rate, followed by a jump in viscosity as the threshold value is exceeded. An example of the latter group is a mixture comprising 1.31% polyvinyl alcohol, 4.48% sodium borate, and the balance water, weight basis. This mixture exhibits a gradually increasing apparent viscosity of 12 to 18 poises as the shear rate increases from 0 to 15 R.S.; the viscosity then rises rapidly to 30 poises as the shear rate reaches 20 R.S.; between 20 and 22.5 R.S. the threshold value is reached and exceeded, and the viscosity jumps to a value above 60 poises. With this last-mentioned type of liquid present in a coupling, which is correlated thereto, the viscosity begins to increase as the shear rate begins to increase, this being in some contrast to the liquid of FIG. 1 where the viscosity does not rise with increasing shear rate until the threshold value is reached; however, since there is a jump in viscosity at the threshold rate, the torque also exhibits a sharp rise.

Another type of liquid may exhibit, below the threshold value, a gradually decreasing viscosity with increasing shear rate, followed by a jump in viscosity as the threshold value is exceeded. An example of this type is a mixture comprising, weight basis, 1.62% polyvinyl alcohol 65/98, 0.073% sodium borate, and the balance water. This mixture exhibits a gradually decreasing apparent viscosity, ranging from 0.17 to 0.13 poise, as the shear rate increases from 0 to 480 R.S. Beyond the threshold value, which occurs at approximately 450 R.S., the viscosity increases sharply from 0.14 poise at 500 R.S. to 0.35 poise at 1200 R.S.

It is to be understood that the liquids contemplated herein exhibit order-of-magnitude changes in viscosity, i.e., changes of at least twofold, for small changes in shear rate. In some cases, shear thickening is accompanied by the appearance of normal stress or normal force effects, referred to below, and these may have a magnitude of up to 20, 30, or even up to 40 times the corresponding shear stress, at the same shear rate.

Referring to the gap 20 in FIG. 2, while this can be omitted in favor of conventional engineering tolerances, the gap is preferred because it minimizes viscous energy dissipation in that portion of the liquid which is contained therein. The peripheral clearance at 18, as is apparent, enables liquid to flow from one side of the plate to the other, thus permitting axial movement of the plate.

In FIGS. 4 and 5 a modified coupling is shown, the former showing the device in the no load state and the latter in the load state. The peripheral clearance at 18 of FIG. 1 is omitted in favor of a seal 40, and a passage 41 in plate 17a and passages 42, 43, and 44 in shaft 16a are provided to permit liquid to flow from the left hand side of plate 17a to the right hand side.

In order to reduce the area of contact between plate 17a and the housing, seal 40 is reduced in size, and the plate is bevelled as at 48. This same construction may, if desired, be employed in FIG. 6.

Associated with the coupling of FIGS. 4–5 as an optional structure for optional use therewith are pipes 45 and 46 and a small pump 47. Pipe 45 connects the pump to the gap 38 while pipe 46 connects it to the gap 20. The pump may be started when the coupling is in the FIG. 5 position, i.e., operating under load, and its action is to remove liquid from gap 20 and deliver it to gap 38 where it flows radially through the shearing field. Several effects result from this action, including decreased losses from viscous dissipation and an increased effective deformation rate of the liquid. The latter effect of course means a greater viscosity and torque conversion. Another effect is an improved or more flexible control over the torque, and this may be described briefly by pointing out that the liquid in compartment 25a not only experiences shear induced by the rotating cone, which is a tangential or rotary shear, but also an axial shear induced by the action of the pump. These two types of shear combine to provide a "coupling effect" phenomenon, according to which the shear rate developed by rotation can be added to that produced by the axial flow from the pump. For example, and using FIG. 1 to illustrate the point, if the cone of FIGS. 4–5 is rotating at such a speed that the rotary shear is less than the threshold or critical rate of 475 R.S., the liquid will not thicken and substantial torque conversion will not occur. Now, if the pump is started, producing the described axial shear, the two types of shear are additive, and if their sum exceeds the threshold shear rate, then the liquid thickens and torque conversion takes place. If the added shear rates do not exceed the threshold value, it is possible to increase either the rotary or the axial shear, or both, until the threshold value is exceeded. In the result, it is possible to maintain a constant rotary speed for the combination, and by adjusting the pump flow rate, to exceed the threshold value so that torque conversion is accomplished without increasing the speed of shaft 14a. Flexibility of control over torque conversion is thus possible.

It is also possible to develop torque conversion relying only on the axial shear of the liquid, just as it is possible to develop the same by means of rotary shear alone, as described.

It will be understood that the pump 47 may be employed with any of the modifications of the invention.

Also, instead of relying on pump 47 to produce axial flow radially through the shearing field, this effect may be accomplished by taking care to see that the shear-thickening liquid 13 is a viscoelastic liquid. Such a liquid, as indicated, exhibits both viscous and elastic behavior; it also exhibits the normal force phenomenon, namely, during application of rotary stress, it undergoes rotary shear and produces a force normal to the opposed confining surfaces comprising the opposing surfaces of cone 15a and plate 17a. Such normal force, which extends along the common rotational axis of the cone and plate, is the sum of individual forces which are distributed circumferentially of the cone and plate and which extend radially from the periphery of the cone and plate toward the said common axis. These individual forces are centripetal forces, and as may be appreciated, act to provide axial flow radially through the shearing field. Thus, in order to make these forces operative, a valve can be substituted for the pump, and by merely opening the valve the described axial flow can be established. This procedure is to be understood as applicable to all modifications.

In FIG. 6 a modification is shown wherein the passages 41–44 of FIGS. 4–5 are replaced by circumferentially arranged passages 50 in the plate 17b. This disposition of the passages represents a simplification of FIGS. 4–5 to the extent that the passages in the shaft 16b are omitted. The operation of FIG. 6 is like that of FIGS. 4–5 and may include use of the pump or valve 47.

It may be noted in passing that the cone/plate geometry constitutes a preferred system in that the liquid tends to exhibit substantially the same deformation rate over the entire shear zone, thus favoring a uniform response at the threshold shear rate, particularly in the case of liquids whose threshold value is unusually sharp.

FIGS. 7–10 illustrate other solid geometrical elements or figures that may be employed in place of the cone and plate of FIGS. 1–6. The showing is simply a cross section of the element which applies stress to the liquid or which is driven by th eliquid in shear, it being understood that in some cases, as in FIG. 9, the element will be fixedly mounted on a backing which rotates therewith.

In FIG. 7 the driving and driven elements are both in the form of plates 55, 56, like the plate 17 of FIG. 2.

In FIG. 8 both elements are cones 60, 61, disposed as shown.

In FIG. 9 both elements are annular rings or cylinders 65, 66. Preferably, each cylinder has a length which is substantially equal to the diameter. The elements are each attached to a backing, not shown, so that they may be rotated.

In FIG. 10 both elements 70, 71 are in the form of cylinders one of which may interfit in or with the other.

It will be understood that the elements of a coupling may be the same, as in FIGS. 7–9, or they may be different, as in FIGS. 1–6 and 10. Other pairs of different elements are also possible.

Referring generally to the elements, it may be recalled that each is rotatable relatively to the other and to the housing. Viewed from the side, rather than the edge, each is of circular outline, and each has the same axis of rotation. Each element of a pair is able to approach the other quite closely, right up to actual contact, although as noted contact is not necessary. The driven element is further characterized by being axially movable and by having means for permitting liquid to flow from one side to the other.

Turning again to the liquids, it was noted that they are shear-thickening liquids, of which two examples were set forth. Other examples are aqueous solutions of polymethacrylates and poly(alkyl methacrylates), preferably containing at least 9% by weight of the polymer; an aqueous solution of gum arabic and borate ions; an aqueous solution of guar gum and borate ions, etc. Nonaqueous compositions are suitable, including a 25% dispersion of calcium stearate in mineral oil; a polyvinyl alcohol-borate complex in ethylene glycol, etc. Other categories of interest are negative thixotropic and rheopectic systems, comprising such liquids as "Laminac 4134" (American Cyanamid); an unsaturated polyester of the maleic type mixed with styrene; "Epon 826" (Shell), whose molecular formula may be given as

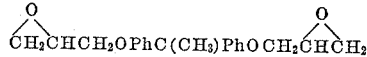

where Ph is phenyl; solutions in toluene or ethylbenzene of a saturated polyester prepared from propylene glycol, phthalic anhydride, and succinic acid, in molar ratios of 2:1:1, respectively, and having an acid number of about 39.1; and a toluene solution of "Dalterol PRI" (Imperial Chemical Industries), an aliphatic saturated polyester.

Still other useful shear-thickening materials may be found in the literature, and include the category of dilatant materials.

The invention is of general application to devices in which torque is converted and/or controlled, including automatic transmissions, clutches, fluid power amplifiers, fluid-actuated controllers, fluid logic systems, and the like. It is capable of simplifying the construction of these and like devices for use in many applications, as in automobiles, trucks, locomotives, tractors, aircraft, hydrodynamic vehicles, propulsion systems, control systems, process machinery, machine tools, and the like. For example, it dispenses with the need for impellors, vanes, and other "power losing" structures found in many conventional power transmission devices. And as indicated, its use can avoid much of the slip and viscous dissipation of energy which characterize many fluid-operated clutches, couplings, etc.

The terms "outer" or "outwardly," as used in connection with points disposed radially of the cone and/or plate, refers to points disposed toward their periphery, while "inner" or "inwardly" refers to points disposed toward their axis of rotation. When used to refer to points located axially of the shafts, "outer" or "outwardly" refers to points disposed away from the transverse center of the housing, while "inner" or "inwardly" refer to points disposed toward such transverse center.

The term "liquid" means all fluid-like materials other than gases, and includes liquid-like materials or systems.

The driving member can be the driven one and vice versa.

It will be understand that the invention is capable of obvious variations without departing from its scope.

In the light of the foregoing description, the following is claimed:

1. In a power transmission device comprising a driving member, a driven member axially spaced therefrom and axially movable toward and from the driving member, and a liquid in the space between said members for providing a driving connection therebetween, the improvement wherein the driving member and the driven member each comprises a smooth surface rotatable element; said liquid being a rheologically complex shear-thickening liquid characterized by having a well-defined threshold shear rate at which the liquid exhibits a sharp increase in viscous resistance and undergoes thickening as the shear rate exceeds said threshold rate; means for placing said liquid in shear such that the shear rate thereof exceeds said threshold rate, whereby the driving member is able to rotate the driven member through the increased viscous resistance of said liquid.

2. The device of claim 1 wherein said means comprises said driving member, rotation of which places said liquid in tangential shear.

3. The device of claim 1 wherein said means comprises said driving member together with means for axially moving said driven member from a first position where the rate of shear of the liquid, as resulting from stress applied by the driving member is below said threshold rate, to a second position, nearer to said driving member, where the rate of shear exceeds said threshold rate.

4. The device of claim 1 wherein said means comprises means for placing said liquid in both tangential shear and axial shear.

5. The device of claim 1 wherein said means includes said driving member together with means for axially moving said driven member from a first position where the rate of shear of the liquid, as resulting from stress applied by the driving member, is below said threshold rate, to a second position, nearer to said driving member, where the rate of tangential shear approaches said threshold rate, and means for flowing liquid radially across said space so as to produce axial shear and thus provide a total shear rate which exceeds said threshold rate.

6. The device of claim 5 wherein said means for flowing liquid radially across said space comprises a pump.

7. The device of claim 5 in which said liquid is a viscoelastic one, and wherein said means for flowing liquid radially across said space comprises the normal force effect exhibited by said viscoelastic liquid in shear.

8. In a power transmission device comprising a driving member, a driven member axially spaced therefrom and axially movable toward and from the driving member, and a liquid in the space between said members for providing a driving connection therebetween, the improvement wherein the driving member and the driven member each comprises a smooth surface rotatable element, said liquid being a rheologically complex shear-thickening liquid characterized by having a well-defined threshold shear rate, the liquid exhibiting a sharp increase in viscous resistance and undergoing thickening as the shear rate exceeds said threshold rate; rotation of the driving member serving to apply stress to said liquid and place the same in shear but so that the shear rate thereof does not exceed said threshold rate, means for increasing the shear rate of the liquid so as to exceed said threshold shear rate, whereby said liquid exhibits a sharp increase in viscous resistance and undergoes thickening, thereby increasing the torque applied to the driven member.

References Cited

UNITED STATES PATENTS

| | | | |
|---|---|---|---|
| 2,313,132 | 3/1943 | Elliott | 192—58 |
| 2,954,857 | 10/1960 | Palm | 192—58 |
| 2,948,268 | 9/1960 | Roper et al. | 192—58 |
| 3,209,874 | 10/1965 | Foster et al. | 192—58 |
| 3,299,952 | 1/1967 | Savins | 166—22 |
| 3,340,976 | 9/1967 | Cox | 192—103 |

MARTIN P. SCHWADRON, *Primary Examiner.*

C. B. LEEDOM, *Assistant Examiner.*